US012321176B2

(12) United States Patent
Zaydel et al.

(10) Patent No.: US 12,321,176 B2
(45) Date of Patent: Jun. 3, 2025

(54) STEERING SYSTEM FAULT RESPONSE FOR AUTONOMOUS VEHICLES (71) Applicant: Waymo LLC, Mountain View, CA (US)

(72) Inventors: Justin Zaydel, Mountain View, CA (US); Nolan McPeek-Bechtold, Belmont, CA (US); James Harris, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 243 days.

(21) Appl. No.: 16/993,868

(22) Filed: Aug. 14, 2020

(65) Prior Publication Data

US 2022/0050463 A1 Feb. 17, 2022

(51) Int. Cl.
*B62D 6/00* (2006.01)
*G05D 1/00* (2006.01)

(52) U.S. Cl.
CPC .......... *G05D 1/0212* (2013.01); *B62D 6/00* (2013.01); *G05D 1/0088* (2013.01)

(58) Field of Classification Search
CPC .......... G05D 1/0088; G05D 1/0212; G05D 2201/0213; B62D 15/025; B62D 6/00; B60W 30/00
See application file for complete search history.

(56) References Cited

U.S. PATENT DOCUMENTS

| 7,178,613 B2 * | 2/2007 | Yanaka | B62D 6/008 |
| | | | 180/404 |
| 10,046,743 B2 | 8/2018 | Jonasson et al. | |
| 10,471,956 B2 | 11/2019 | Kim et al. | |
| 10,562,561 B2 | 2/2020 | Wang et al. | |
| 2003/0120406 A1 * | 6/2003 | Raypole | B62D 5/049 |
| | | | 701/43 |
| 2004/0210345 A1 * | 10/2004 | Noda | G05D 1/0227 |
| | | | 318/568.12 |
| 2008/0047775 A1 * | 2/2008 | Yamazaki | B62D 6/008 |
| | | | 180/443 |
| 2013/0261894 A1 * | 10/2013 | Kojima | B62D 6/00 |
| | | | 701/41 |
| 2016/0200353 A1 * | 7/2016 | Sasaki | B62D 6/00 |
| | | | 701/43 |

(Continued)

FOREIGN PATENT DOCUMENTS

CN 111032490 A 4/2020
WO 2013051141 A1 4/2013

*Primary Examiner* — Matthew J. Reda
(74) *Attorney, Agent, or Firm* — Botos Churchill IP Law (57) ABSTRACT Aspects of the disclosure relate to controlling a vehicle in an autonomous driving mode. For instance, a control command identifying a steering control position may be received by a steering system of the vehicle from an autonomous driving control system. Orientation of one or more wheels of the vehicle may be controlled according to the steering control position. After receiving the control command, that the steering system has not received a valid control command from the control system for a first predetermined duration may be determined. Based on the determination that the steering system has not received a valid control command from the control system for the first predetermined duration, the orientation of the one or more wheels may be continue to be controlled based on the steering control position.

20 Claims, 8 Drawing Sheets (56) References Cited

U.S. PATENT DOCUMENTS

| | | | |
|---|---|---|---|
| 2017/0267221 A1* | 9/2017 | Hecker | B60T 7/085 |
| 2018/0087929 A1* | 3/2018 | Matsumura | B62D 1/046 |
| 2018/0141548 A1* | 5/2018 | Coburn | B60K 35/10 |
| 2018/0229738 A1* | 8/2018 | Nilsson | B60W 50/0205 |
| 2018/0336007 A1* | 11/2018 | Li | G10L 15/22 |
| 2018/0362043 A1* | 12/2018 | Hwang | B62D 15/025 |
| 2019/0023310 A1* | 1/2019 | Odate | G01D 5/241 |
| 2019/0092341 A1* | 3/2019 | Stark | B60W 10/04 |
| 2019/0168805 A1* | 6/2019 | Siskoy | B60W 30/095 |
| 2019/0168807 A1* | 6/2019 | Polmans | B62D 5/0484 |
| 2019/0233087 A1* | 8/2019 | Avritch | G05D 1/0088 |
| 2019/0270478 A1* | 9/2019 | Kim | B62D 15/025 |
| 2019/0308603 A1 | 10/2019 | Matsumura | |
| 2019/0389509 A1* | 12/2019 | Kim | B62D 5/0484 |
| 2020/0017124 A1* | 1/2020 | Camhi | B60W 60/0053 |
| 2020/0023860 A1* | 1/2020 | Lee | B60W 30/18 |
| 2020/0086741 A1 | 3/2020 | Sadakiyo et al. | |
| 2020/0150659 A1 | 5/2020 | Guptha et al. | |
| 2020/0189655 A1* | 6/2020 | Ahn | B62D 5/006 |
| 2021/0044245 A1* | 2/2021 | Okubo | B62D 5/0463 |
| 2021/0061431 A1* | 3/2021 | Mcginley | B63H 20/12 |
| 2021/0229704 A1* | 7/2021 | Zhu | B60W 50/10 |
| 2021/0247760 A1* | 8/2021 | Kusama | B60L 3/003 |
| 2022/0402542 A1* | 12/2022 | Otogawa | B62D 6/008 |
| 2023/0033041 A1* | 2/2023 | Grossheim | B62D 15/025 |

\* cited by examiner

STEERING SYSTEM FAULT RESPONSE FOR AUTONOMOUS VEHICLES

BACKGROUND

Some vehicles may operate in various modes which provide different levels of control to a driver. For instance, typical vehicles may operate in manual driving modes, where a human operator or driver controls acceleration, deceleration, and steering of the vehicle as well as semi-autonomous driving mode, such as cruise control, where a computer of the vehicle controls acceleration and deceleration while a driver controls steering, etc. In some instances, these vehicles may also operate in autonomous driving modes where the computer of the vehicle controls all of braking, all of the acceleration, deceleration and steering of the vehicle without continuous input from a driver or passenger. In the autonomous driving mode, the passenger may provide some initial input, such as a destination location, and the vehicle maneuvers itself to that destination.

Existing steering systems may be single fault tolerant (i.e. there is no redundant system). Thus, if there is a complete loss of communication with an autonomous driving control system (e.g. systems which enable the vehicle to operate in an autonomous or semi-autonomous driving mode), these systems may rely on a human to take over. However, for vehicles which can operate fully autonomously, that is without a driver, there may be no human backup.

BRIEF SUMMARY

Aspects of the disclosure provide a method for controlling a vehicle in an autonomous driving mode. The method includes receiving, by a steering system of the vehicle from an autonomous driving control system including one or more processors, a control command identifying a steering control position; controlling, by the one or more processors of the steering system, an orientation of one or more wheels of the vehicle according to the steering control position; after receiving the control command, determining, by the one or more processors of the steering system, that the steering system has not received a valid control command from the control system for a first predetermined duration; and based on the determination that the steering system has not received a valid control command from the control system for the first predetermined duration, continuing, by the one or more processors of the steering system, to control the orientation of the one or more wheels based on the steering control position.

In one example, the control command is a last control command received before the first predetermined duration. In this example, the first predetermined duration is a fixed number of message cycles. In another example, the method also includes, after receiving the control command, determining that the steering system has not received a valid control command from the control system for a second predetermined duration, and based on the determination that the steering system has not received a valid control command from the control system for the second predetermined duration, continuing to control the orientation of the vehicle based on the steering control position and ignoring control commands received from the autonomous driving control system. In this example, the control command is a last control command received before the second predetermined duration. In another example, the method also includes, while continuing to control the orientation of the one or more wheels, receiving a second control command identifying a second steering control position from the autonomous driving control system, and controlling the orientation of the one or more wheels based on the second steering control position. In this example, the method also includes, prior to controlling the orientation of the one or more wheels based on the second steering control position, determining that the steering system has received a valid control command from the control system with a second predetermined duration.

Another aspect of the disclosure provides a system for controlling a vehicle in an autonomous driving mode. The system includes an autonomous driving control system including one or more processors, and a steering system. The steering system includes one or more processors configured to receive, from the autonomous driving control system, a control command identifying a steering control position, control an orientation of one or more wheels of the vehicle according to the steering control position, after receiving the control command, determine that the steering system has not received a valid control command from the control system for a first predetermined duration, and based on the determination that the steering system has not received a valid control command from the control system for the first predetermined duration, continue to control the orientation of the one or more wheels based on the steering control position.

In this example, the control command is a last control command received before the first predetermined duration. In addition, the first predetermined duration is a fixed number of message cycles. In another example, the one or more processors of the steering system are further configured to: after receiving the control command, determine that the steering system has not received a valid control command from the control system for a second predetermined duration; and based on the determination that the steering system has not received a valid control command from the control system for the second predetermined duration, continue to control the orientation of the vehicle based on the steering control position and ignoring control commands received from the autonomous driving control system. In this example, the control command is a last control command received before the second predetermined duration. In another example, the one or more processors of the steering system are further configured to: while continuing to control the orientation of the one or more wheels, receive a second control command identifying a second steering control position from the autonomous driving control system; and control the orientation of the one or more wheels based on the second steering control position. In this example, the one or more processors of the steering system are further configured to, prior to controlling the orientation of the one or more wheels based on the second steering control position, determine that the steering system has received a valid control command from the control system with a second predetermined duration.

A further aspect of the disclosure provides a non-transitory, machine readable medium on which instructions are stored. The instructions, when executed by one or more processors, cause the one or more processors to perform a method for controlling a vehicle in an autonomous driving mode. The method includes receiving from the autonomous driving control system including one or more processors, a control command identifying a steering control position; controlling an orientation of one or more wheels of the vehicle according to the steering control position; after receiving the control command, determining that a steering system of the vehicle has not received a valid control command from the control system for a first predetermined duration; and based on the determination that the steering system has not received a valid control command from the control system for the first predetermined duration, continuing to control the orientation of the one or more wheels based on the steering control position.

In this example, the control command is a last control command received before the first predetermined duration. In this example, the method also includes, after receiving the control command, determining that the steering system has not received a valid control command from the control system for a second predetermined duration; and based on the determination that the steering system has not received a valid control command from the control system for the second predetermined duration, continuing to control the orientation of the vehicle based on the steering control position and ignoring control commands received from the autonomous driving control system. In this example, the control command is a last control command received before the second predetermined duration. In another example, the method also includes, while continuing to control the orientation of the one or more wheels, receiving a second control command identifying a second steering control position from the autonomous driving control system; and controlling the orientation of the one or more wheels based on the second steering control position. In this example, the method also includes, prior to controlling the orientation of the one or more wheels based on the second steering control position, determining that the steering system has received a valid control command from the control system with a second predetermined duration.

DETAILED DESCRIPTION

Overview

The technology relates to steering systems fault responses for autonomous vehicles. As noted above, existing steering systems may be single fault tolerant (i.e. there is no redundant system). Thus, if there is a complete loss of communication with an autonomous driving control system, these systems may rely on a human to take over. However, for vehicles which can operate fully autonomously, that is without a driver, there may be no human backup. In such situations, the steering system may react in a more predictable way whenever there is a temporary or long duration loss in communication with the autonomous driving control system.

When operating in an autonomous driving mode, the autonomous driving control system may control the orientation of the vehicle's wheels by sending control commands from the computing devices of the autonomous driving control system to the steering system. These control commands may include signals identifying steering control positions. The steering system may use the steering control positions to control the orientation of the vehicle (e.g. by controlling the operation of a motor of the steering system) in accordance with a trajectory generated by a planning system of the autonomous driving control system without requiring input to a steering wheel.

If the steering system loses communication with the autonomous driving control system or does not receive valid control commands for more than a first predetermined duration, the steering system may respond by continuing to maintain the last valid steering control position. If the autonomous driving control system has stopped communicating with the steering system, it may be due to a complete failure or temporary communication fault of the autonomous driving control system. In such cases, the deceleration system may be bringing the vehicle to a stop due to a similar loss of communication, and the steering system will maintain the change in orientation of the vehicle in a more predictable way.

In some instances, such as a temporary communication fault, the autonomous driving control system may resume sending control commands. In such instances, depending upon how long the lack of communication continued, the steering system may act upon or ignore the control commands. If the steering system completely loses communication with the autonomous driving control system or receives no valid control commands for more than the second predetermined duration, the steering system may ignore the control commands.

If the autonomous driving control system has temporarily stopped communicating with the steering system, there may be value in allowing the autonomous driving control system to regain control authority if communication resumes. However, if the autonomous driving control system stops communicating for an extended period of time and then resumes communicating, the autonomous driving control system may be in an invalidated state and therefore such control commands may need to be ignored.

The features described herein may provide for a useful and practical approach to addressing steering system faults for autonomous vehicles in a way which may improve overall safety of these vehicles. For instance, the steering system is able to take an initial response in the event of certain conditions. If those conditions no longer persist the steering system may resume normal operation, and if those conditions persist for too long, the steering system may ignore any future control commands.

Example Systems

Figure 1:
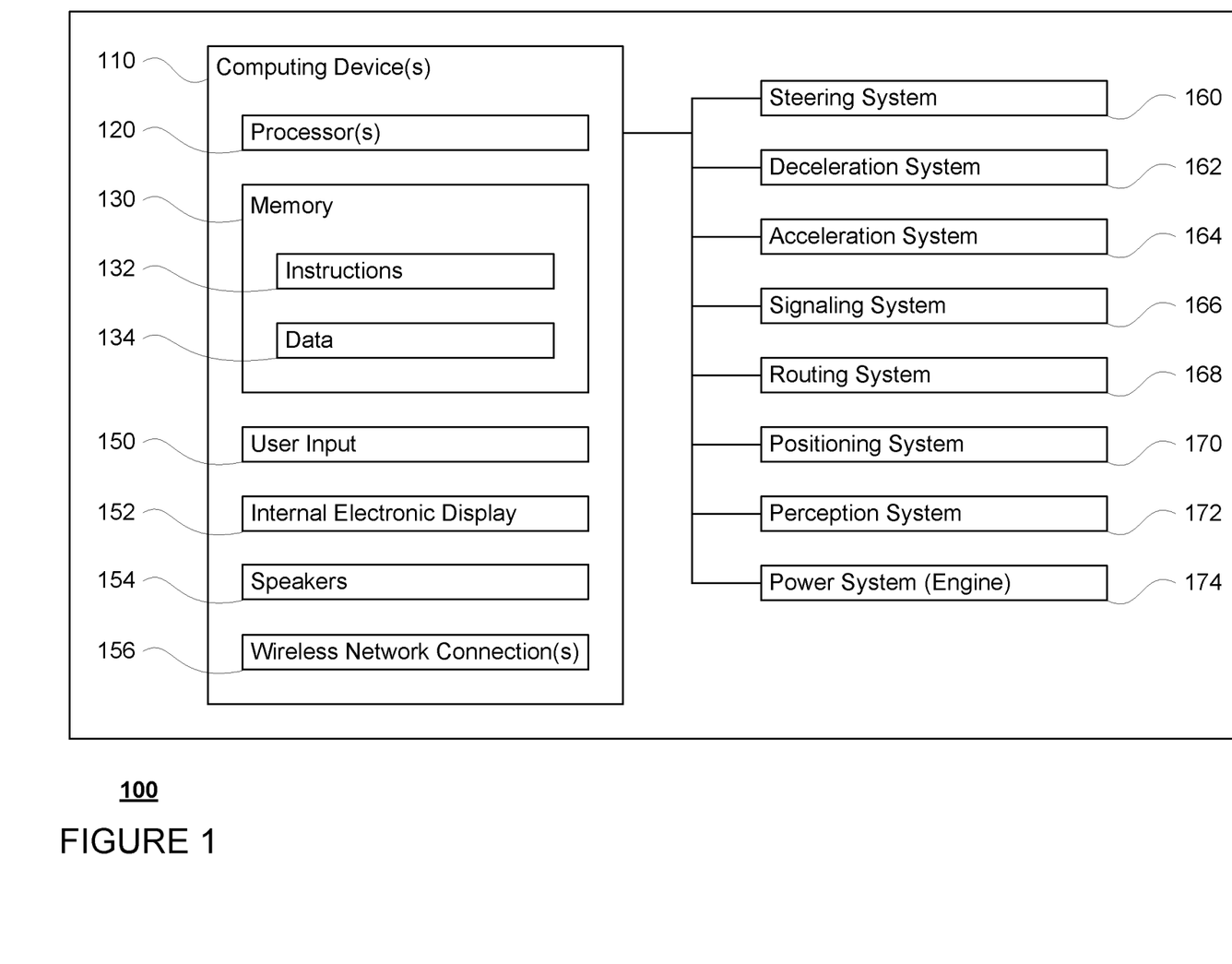
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a non-transitory computing device-readable or other machine-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers 154 to provide information to a passenger of the vehicle 100 as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be a part of an autonomous driving control system for the vehicle and may be capable of communicating with various components of the vehicle in order to control the vehicle in an autonomous driving mode, such as the first and second autonomous driving modes discussed further below. For example, returning to FIG. 1, the computing devices 110 may be in communication with various systems of vehicle 100, such as steering system 160, deceleration system 162, acceleration system 164, routing system 166, planning system 168, positioning system 170, and perception system 172 in order to control the movement, speed, etc. of vehicle 100 in accordance with the instructions 134 of memory 130 in the autonomous driving mode.

As an example, the computing devices 110 may interact with deceleration system 162 and acceleration system 164 in order to control the speed of the vehicle. Similarly, steering system 160 may be used by computing devices 110 in order to control the direction of vehicle 100. For example, if vehicle 100 is configured for use on a road, such as a car or truck, the steering system 160 may include components to control the angle of wheels to turn the vehicle as discussed further below. The computing devices 110 may also use the signaling system in order to signal the vehicle's intent to other drivers or vehicles, for example, by lighting turn signals or brake lights when needed.

Routing system 166 may be used by the computing devices 110 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pull-over spots, vegetation, or other such objects and information.

The routing system 166 may use the map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
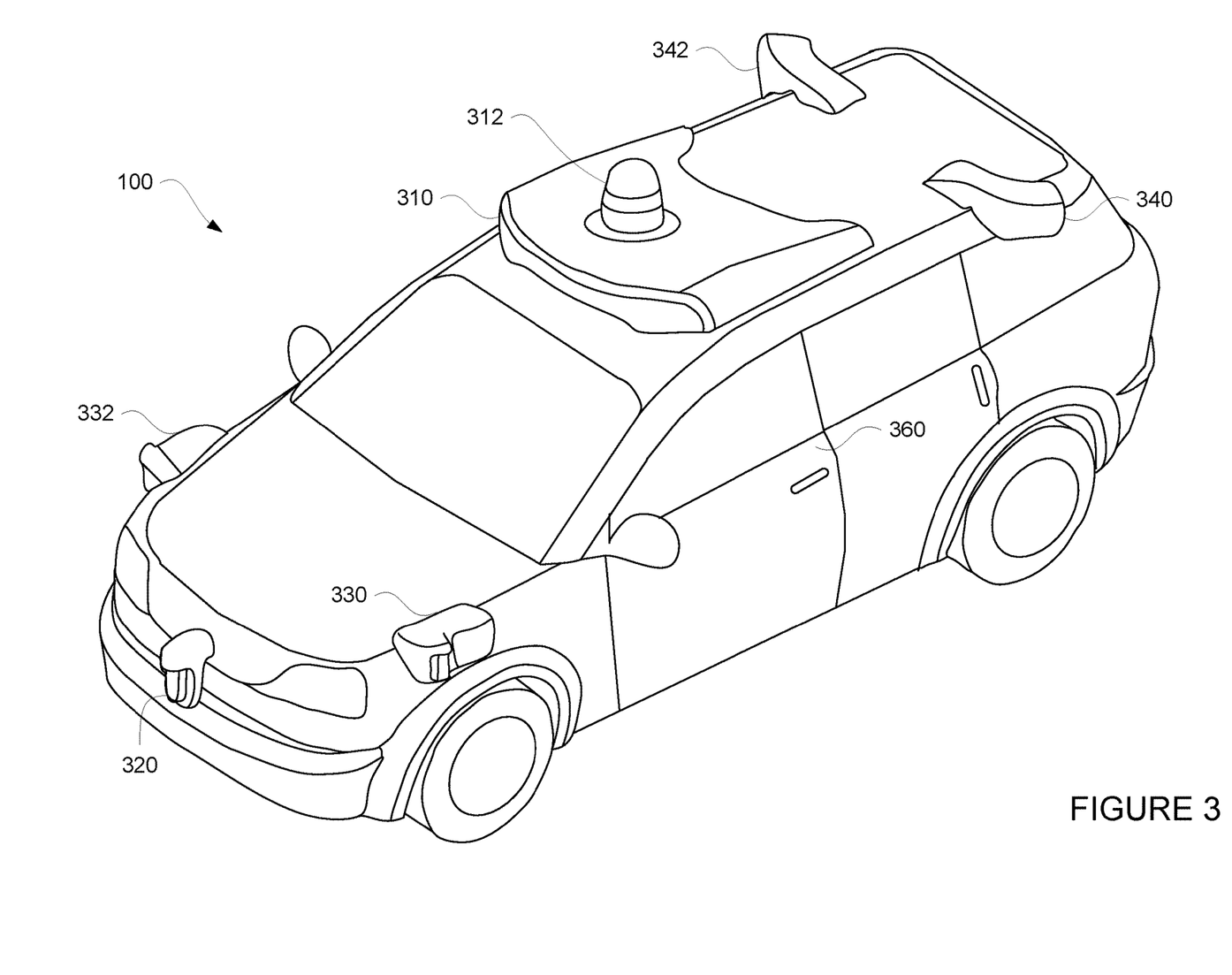
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 162, acceleration system 164, steering system 160, routing system 166, planning system 168, positioning system 170, perception system 172, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 166. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 164), decelerate (e.g., by decreasing the fuel supplied to the engine or power system 174, changing gears, and/or by applying brakes by deceleration system 162), change direction (e.g., by turning the front or rear wheels of vehicle 100 by steering system 160), and signal such changes (e.g., by lighting turn signals). Thus, the acceleration system 164 and deceleration system 162 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
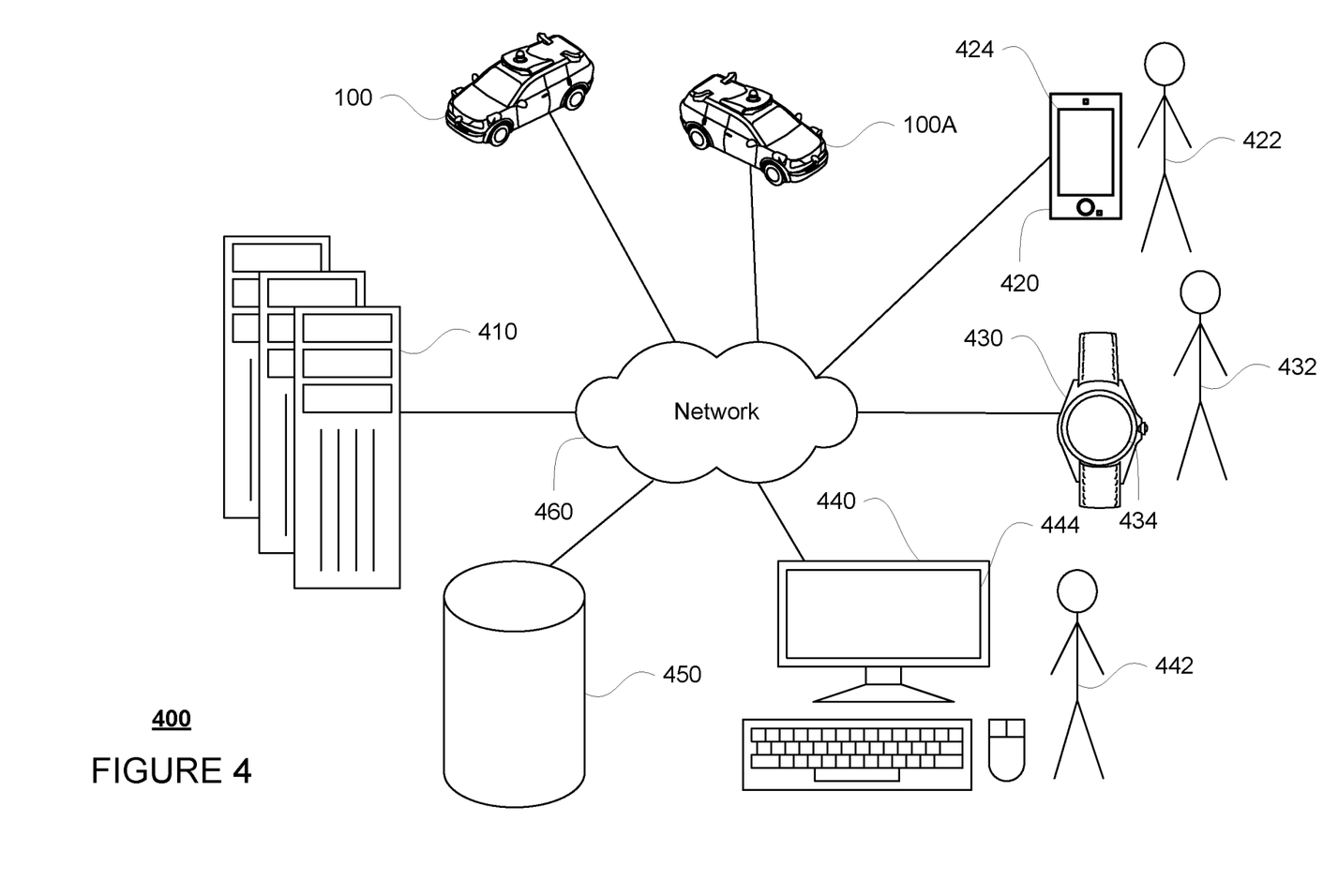
FIG. 4 is a pictorial diagram of an example system in accordance with aspects of the disclosure.
Figure 5:
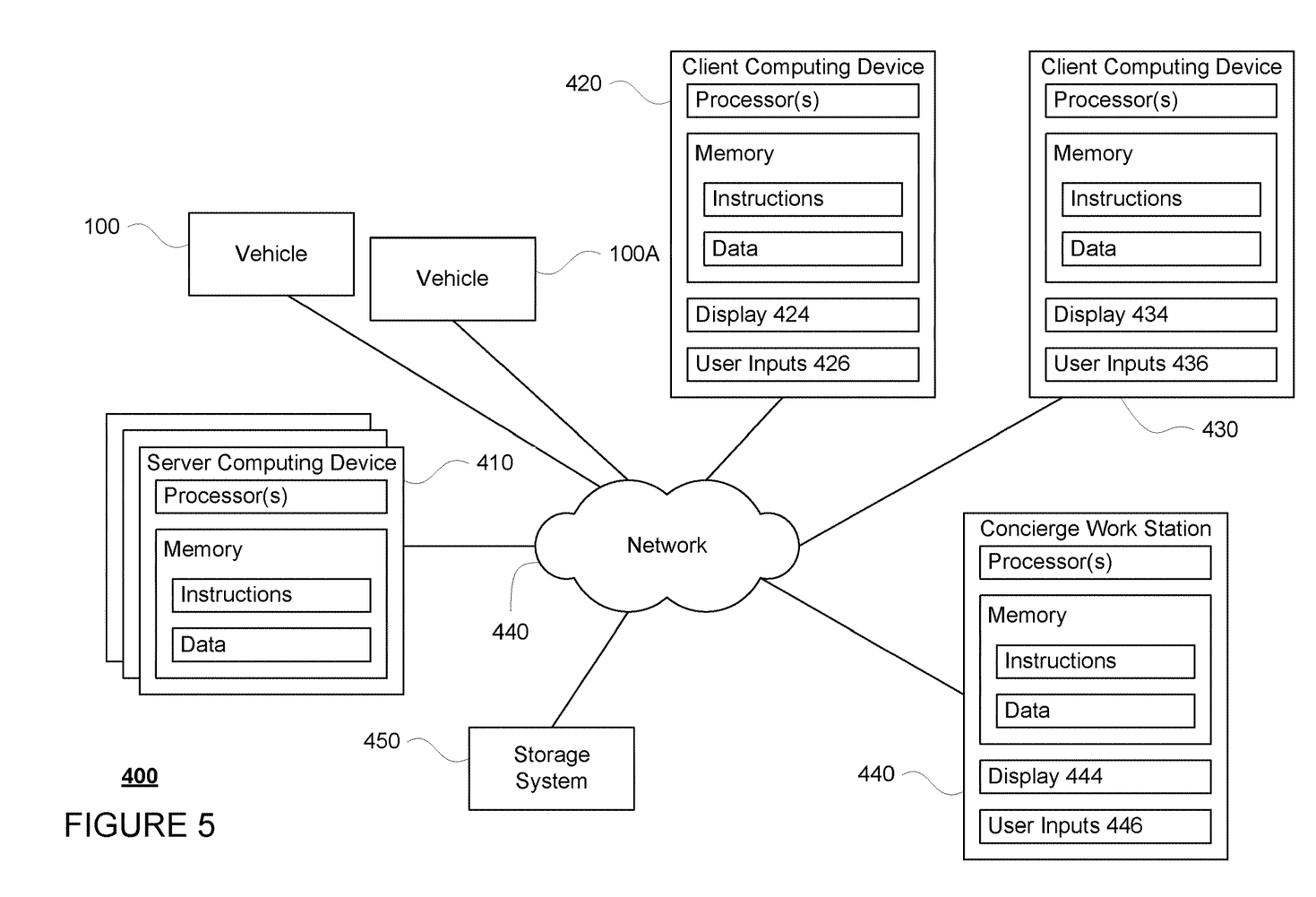
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system (hereafter fleet management system 410) which can be used to dispatch vehicles such as vehicles 100, 100A, 100B to different locations in order to pick up and drop off passengers. In addition, the fleet management system 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 420 may be a mobile phone used by passenger of a vehicle. In other words, user 422 may represent a passenger. In addition, client communication device 430 may represent a smart watch for a passenger of a vehicle. In other words, user 432 may represent a passenger. The client communication device 440 may represent a workstation for an operations person, for example, a remote assistance operator or someone who may provide remote assistance to a vehicle and/or a passenger. In other words, user 442 may represent a remote assistance operator. Although only a few passengers and operations person are shown in FIGS. 4 and 5, any number of such, passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices of the fleet management system 410, in order to perform some or all of the features described herein.

Returning to FIG. 1, the steering system 160 may be a typical rack and pinion steering system, torque overlay system, or a drive-by-wire system which enables control of the steering by electrical signals rather than by physical connections between the steering wheel and the vehicle's wheels. For example, a rack and pinion steering system may include an electric motor and associated power electronics which may be used to linearly displace a rack bar. The rack bar may be contained within a housing that is attached to the vehicle chassis, and the rack bar itself may be attached to tie rod assemblies which translate the linear motion of the rack bar into rotational motion of the front suspension upright assemblies. Also connected to the rack bar may be a pinion shaft with one or more intermediate shafts that connect to the steering column and steering handwheel.

The torque overlay steering system, such as those used in commercial vehicles and trucks, may include an electric motor that rotates the pitman arm with the assistance of the hydraulics in the base gear. The base steering gear may be a combination of multiple advantages and is attached to the ladder frame of the truck. Also, the input shaft of the base gear may be connected to at the steering hand wheel via the steering column. A pitman arm connects the output of the base gear to one of the wheel ends at the steer axle. Further, both the wheels ends at the steer axle may be connected by a tie-rod linkage. So any angular motion in the pitman arm leads to angular motion of the wheels.

When operating in an autonomous driving mode, the autonomous driving control system may control the orientation of the vehicle's wheels by sending control commands as electrical signals from the computing devices 110 to the steering system 160. These control commands may include signals identifying steering control position as an angle and/or rack position (for rack and pinion style steering systems). The steering control position may define a desired position of the vehicle's wheels relative to the vehicle (e.g. 0 degrees being in the forward position) or position of the rack for following a trajectory generated by the planning system 168. A non-linear transfer function may be used to translate the linear displacement of the rack bar into an estimated steering control position. The steering system may use the steering control position to control the orientation of the vehicle (e.g. by controlling the operation of a motor of the steering system) in accordance with a trajectory generated by a planning system of the autonomous driving control system without requiring input to a steering wheel.

Figure 2A:
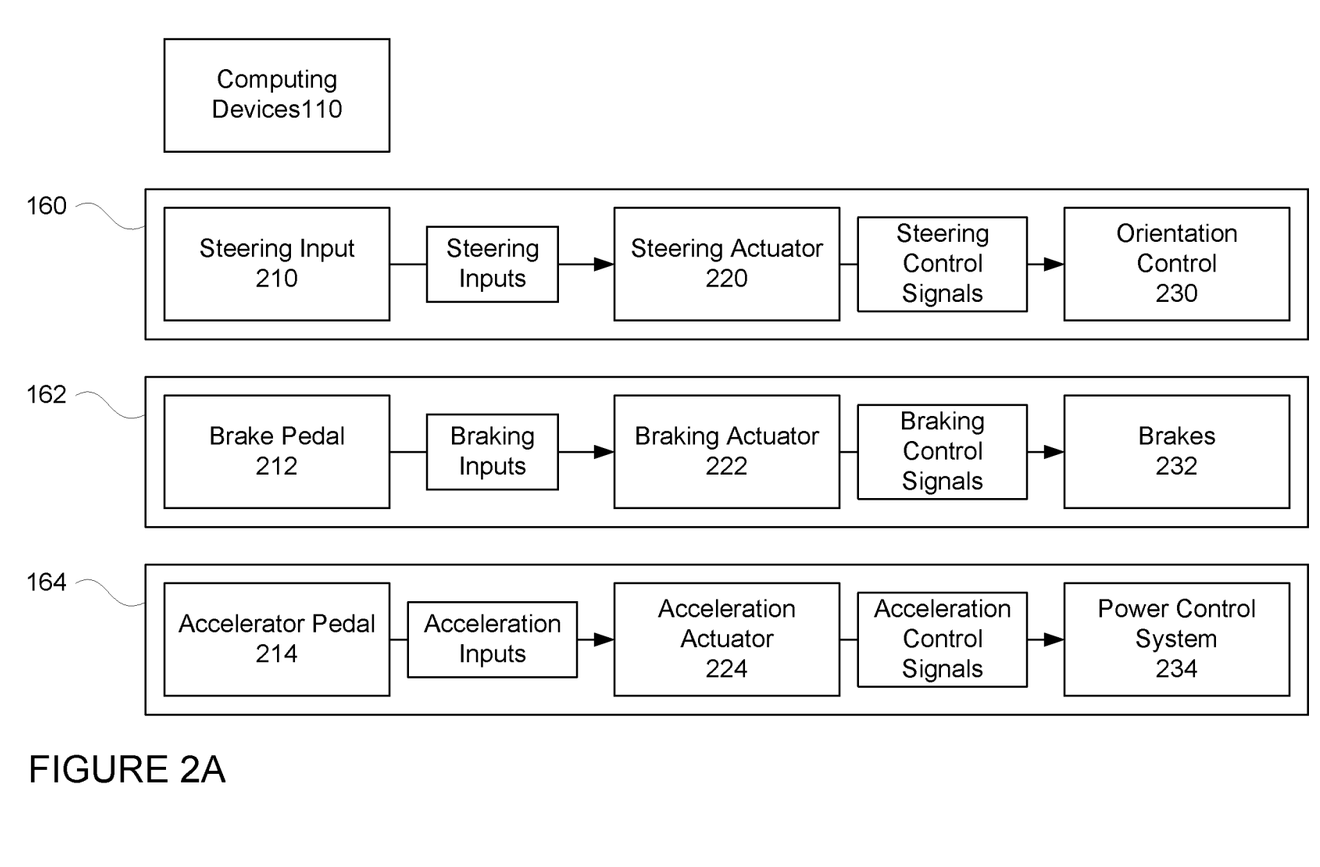
FIGS. 2A and 2B are example functional diagrams of a steering system in accordance with aspects of the disclosure.
Figure 2B:
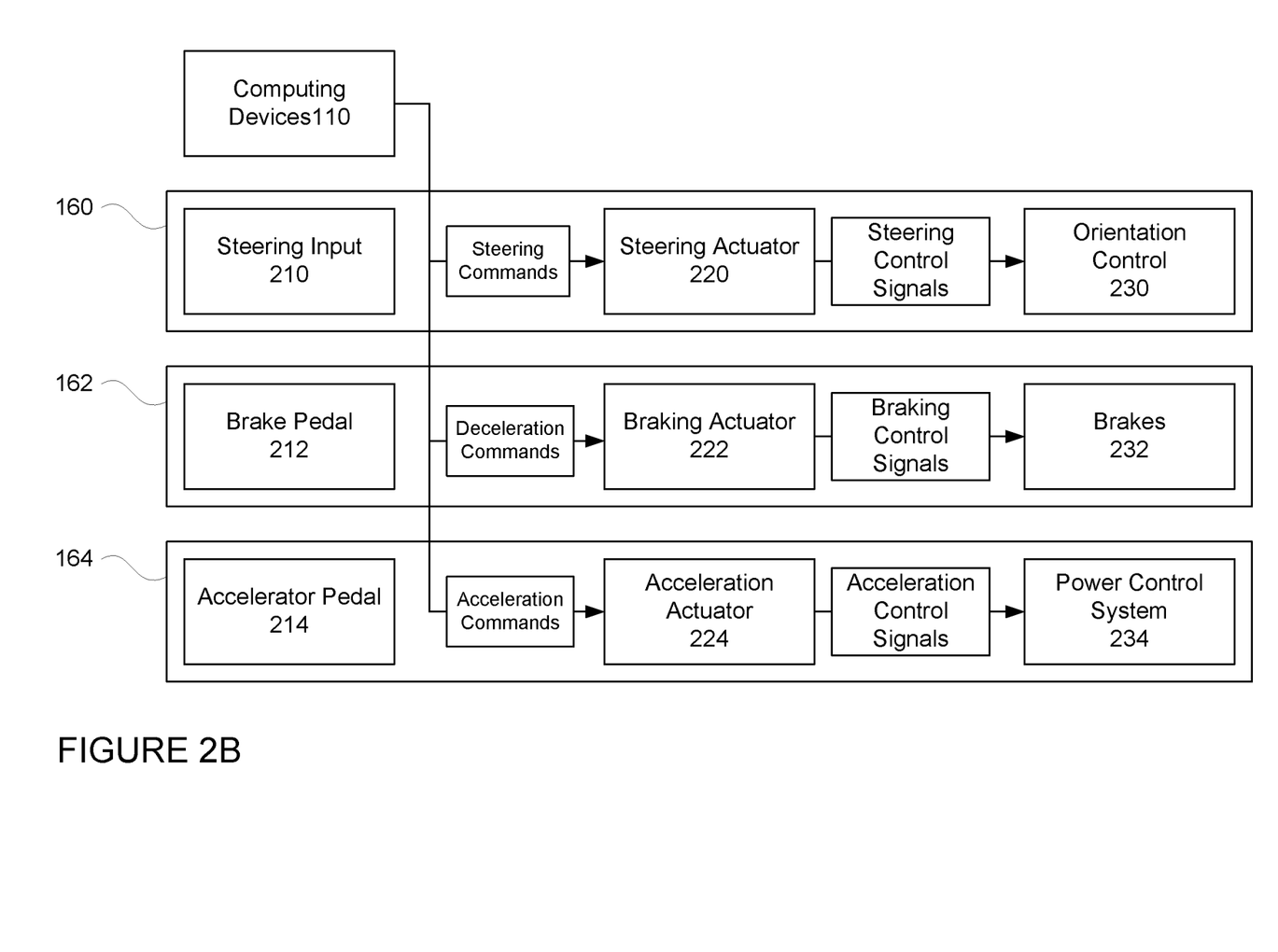

FIGS. 2A and 2B are a functional diagram of the steering, acceleration, and deceleration systems 160, 162, 164 and identifies example relationships between the user input devices which a driver uses to control the vehicle in the manual (or semiautonomous) driving modes, computing devices 110 which generates control commands to control the vehicle in the autonomous driving modes, and the actuators which send instructions to the hardware that control the orientation and speed of the vehicle. In this regard, each actuator may include one or more computing devices having one or more processors and memory which may be configured the same or similarly to computing devices 110, processors 120, and memory 130.

For instance, a steering input 210 (e.g. steering wheel or other device) of the vehicle can be used by the driver to cause the steering actuator 220 of the steering system 160 to control the orientation of the wheels using the orientation control hardware 230 which may include the vehicle's axles and other hardware that can change the orientation of the vehicle's wheels. For example, as shown in FIG. 2A, steering inputs to the steering input 210 are sent to the steering actuator 220 which converts those inputs into corresponding steering control signals which can be acted upon by the orientation control hardware 230. Depending upon the configuration of the vehicle, drive-by-wire or a mechanical connection, these steering inputs may be converted to electronic signals before being received by the steering actuator or may be received physically by a hardware connection to the steering actuator. Similarly, as shown in FIG. 2B, the computing devices 110 may send commands to the steering actuator 220 to cause the steering actuator 220 to send corresponding steering control signals to the orientation control hardware 230 to control the orientation of the wheels.

The brake pedal 212 can be used by the driver to cause the braking actuator 222 of the deceleration system 162 to control the position of the brakes 232. For example, as shown in FIG. 2A, inputs to the brake pedal 212 are sent to the braking actuator 222 which converts those inputs into braking control commands which can be acted upon by the brakes 232. Depending upon the configuration of the vehicle, drive-by-wire or a mechanical connection, these braking inputs may be converted to electronic signals before being received by the braking actuator or may be received physically by a hardware connection to the braking actuator. Similarly, as shown in FIG. 2B, the computing devices 110 may send commands to the steering actuator 220 to cause the braking actuator to send corresponding braking control commands to control the position of the brakes.

The accelerator pedal 214 can be used by the driver to cause the acceleration actuator 224 of the acceleration system 164 to control the amount of fuel or energy sent by a fuel or power control system 234 to the engine or motor which in turn, controls the speed of rotation of the vehicle's wheels. The power control system may thus control the amount of fuel (e.g. gasoline, diesel, etc.) or power (from one or more batteries) to the engine or motor of the power system 174. For example, as shown in FIG. 2A, inputs to the accelerator pedal 214 are sent to the acceleration actuator 224 which converts those inputs into acceleration control commands which can be acted upon by the power control system 234. Similarly, as shown in FIG. 2B, the computing devices 110 may send acceleration commands to the actuator 214 to cause the acceleration actuator to send acceleration control signals to the fuel or power control system 234 of the power system 174 in order to control the amount of fuel or energy sent to the engine or motor.

The memory 130 of computing device 110 and/or the memory of the actuators or one or more other computing devices may store configuration instructions to allow the vehicle 100 to operate in different modes including a first driving mode which is a manual driving mode as well as one or more autonomous driving modes. In the manual driving mode, a driver is able to control the deceleration, acceleration, and steering of a vehicle at the user inputs, such as the steering input 210, the brake pedal 212, and the accelerator pedal 214. In addition, vehicle 100 is configured via the configuration instructions such that commands from the computing devices 110 to control the actuators of the deceleration system 162, acceleration system 164, and steering system 160 are given no priority. In other words, in the manual driving mode, commands from the computing devices 110 are invalid or ignored by the steering actuator 220, braking actuator 222, and acceleration actuator 224. In this way, the driver is guaranteed that the autonomous driving control system will not interfere with operation of vehicle 100.

In a second driving mode, or a first autonomous driving mode, the computing devices 110 may expect that a driver is presently in vehicle 100 and capable of controlling the vehicle in the manual driving mode. In other words, the computing devices 110 are configured via the configuration instructions to readily allow transitions from the second driving mode to the first driving mode or rather, from first autonomous driving mode to the manual driving mode. Vehicle 100 is also configured such that commands originating from the user inputs, such as the steering input 210, the brake pedal 212, and the accelerator pedal 214 are given priority over commands from the computing devices 110. In this regard, the driver is able to readily take control by using any of the steering input 210, the brake pedal 212, and the accelerator pedal 214 of vehicle 100. At the same time, the driver is guaranteed by both the computing devices 110 and the steering, braking and acceleration actuators that driver inputs will be prioritized over those of the computing devices 110.

The first autonomous driving mode may also have a plurality of different sub-modes or configurations which allows for different levels of autonomy in different environments. For instance, the first autonomous driving mode may have a first configuration that allows for a fully-autonomous driving mode in specific areas of a pre-mapped environment, but semi-autonomous driving modes (e.g. where a driver controls speed and/or steering) everywhere else. A second configuration may allow a driver to adjust to increase the sensitivity of vehicle 100 to transitions to manual driving mode, for instance, where a driver prefers to more easily change vehicle 100 from the first autonomous driving mode to a semi-autonomous or the manual driving mode.

The first autonomous driving mode may also include a third configuration with additional modifications to allow for safe testing of vehicle 100 when a test driver is present. In order to have a redundant and more reliable means of guaranteeing test driver takeover ability, the transition between the first driverless mode and manual driving mode may be implemented in two different places: the computing devices 110 and at each actuator. The actuator software may be considered well vetted and fixed due to extensive testing and may not change very often. However, the software of the computing devices 110 may be changed and tested regularly. Because the actuators may transition to the manual driving mode independently of the computing devices 110, commands from the computing devices 110 which are improper (i.e. those which continue even though there is a transition to the manual driving mode) are invalid and ignored. This transition may occur, for example, by having a driver (or test driver) take control of one or more of steering, braking, or acceleration. This allows for the safe and effective testing of new or updated software at the computing devices 110.

In a third driving mode, or a second autonomous driving mode, the computing devices 110 may expect that a driver is not presently in vehicle 100 and capable of controlling vehicle 100 in the manual driving mode. In this configuration, both the actuators and computing devices 110 are configured via the configuration instruction to limit the impact of human inputs and transitions to the first driving more or the manual driving mode in order to guarantee the safety of passengers and vehicle 100. In other words, the first autonomous driving mode may be "easier" to enter than the second autonomous driving mode in order to limit use of the second driving mode to situations in which there is no driver capable of controlling vehicle 100 present.

As with the first autonomous driving mode, the second autonomous driving mode may include a plurality of different sub-modes or configurations. As an example, a first configuration may be a fully autonomous "driverless transportation service" mode which can be used to allow vehicle 100 to provide transportation services to passengers or users of the transportation service. This configuration may prevent vehicle 100 from starting a trip if the vehicle does not meet certain conditions, such as if the vehicle is dirty, a door is open, passengers are not sitting in seats and/or do not have seat belt bucked, the vehicle is overloaded (there is too much weight in the vehicle's seats and/or cargo compartments), etc. This configuration may also utilize a partition to prevent passengers from reaching manual controls (steering wheel, brake pedal, acceleration pedal, etc.).

This first configuration may also allow vehicle 100 to accept instruction from a dispatching server such as the server computing devices 410. For instance, when in the first configuration of the second autonomous driving mode, vehicles may be dispatched and/or staged by the server computing devices 410 to locations where a vehicle can safely wait to be assigned a trip. This may include sending a vehicle to a specific location, for instance, waiting at a specific shaded area near a mall, or sending a vehicle to a specific area, for instance, a specific square mile or more or less to drive around and wait for an assignment. Similarly, vehicles may be limited to trips in certain areas as discussed above using, for instance, the second configuration of the second driving mode or by sending vehicle 100 to that area and using geo-fencing to limit movements of the vehicle to within certain areas. This may allow the dispatching servers to confirm that vehicles are sent only where needed, and thereby allow more efficient staging and use of a fleet of vehicles.

A second configuration may be similar to the first configuration, but with some limitations determined based on the current status of vehicle 100. For instance, vehicle 100 may be prevented from entering specific regions, such as school zones, highways, etc., based on the vehicle's computing device's current software version, state of the vehicle's sensors (whether all are operating within normal parameters and/or whether the sensors were calibrated within some predetermined number of miles or period of time, such as 100 miles or more or less or 24 hours), etc. In this regard, if vehicle 100's sensors have not been calibrated at a depot within the last 100 miles or last 24 hours, the vehicle may not be able to drive on highways or in school zones. For instance, if certain sensors, such as radar or cameras, are not recently calibrated, the vehicle may need to avoid unprotected left turns or certain intersections having traffic lights at certain relative positions.

The second autonomous driving mode may also include a third configuration for testing vehicle 100. In this example, the computing devices may control vehicle 100 according to the configuration instructions as if the vehicle were operating in the first configuration. However, a test driver, rather than taking control of steering, acceleration, or deceleration, may use an "emergency stopping" button to immediately stop vehicle 100 in the event of a problem. In this regard, vehicle 100 may apply all braking power available immediately to stop the vehicle as quickly as possible. Generally, because such immediate stopping is not appropriate for when vehicle 100 is providing transportation services, the emergency stopping button may not be available (i.e. may be removable) when operating in the first configuration. In such cases, vehicle 100 may be stopped by a passenger using a pull over request via the passenger's client computing device or a pull over button of the vehicle.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
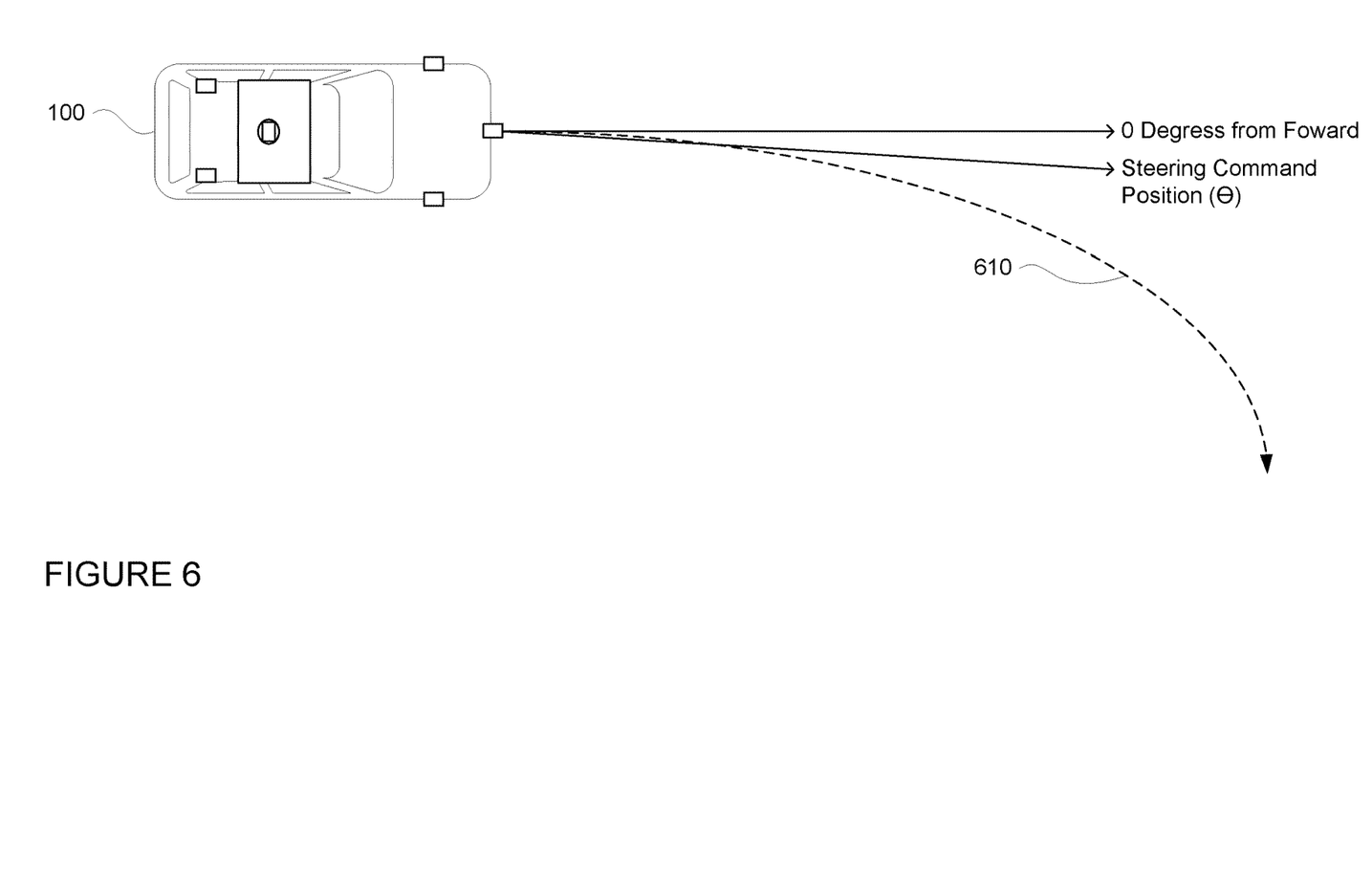
FIG. 6 is an example diagram of a vehicle, a trajectory, and a steering command position in accordance with aspects of the disclosure.
Figure 7:
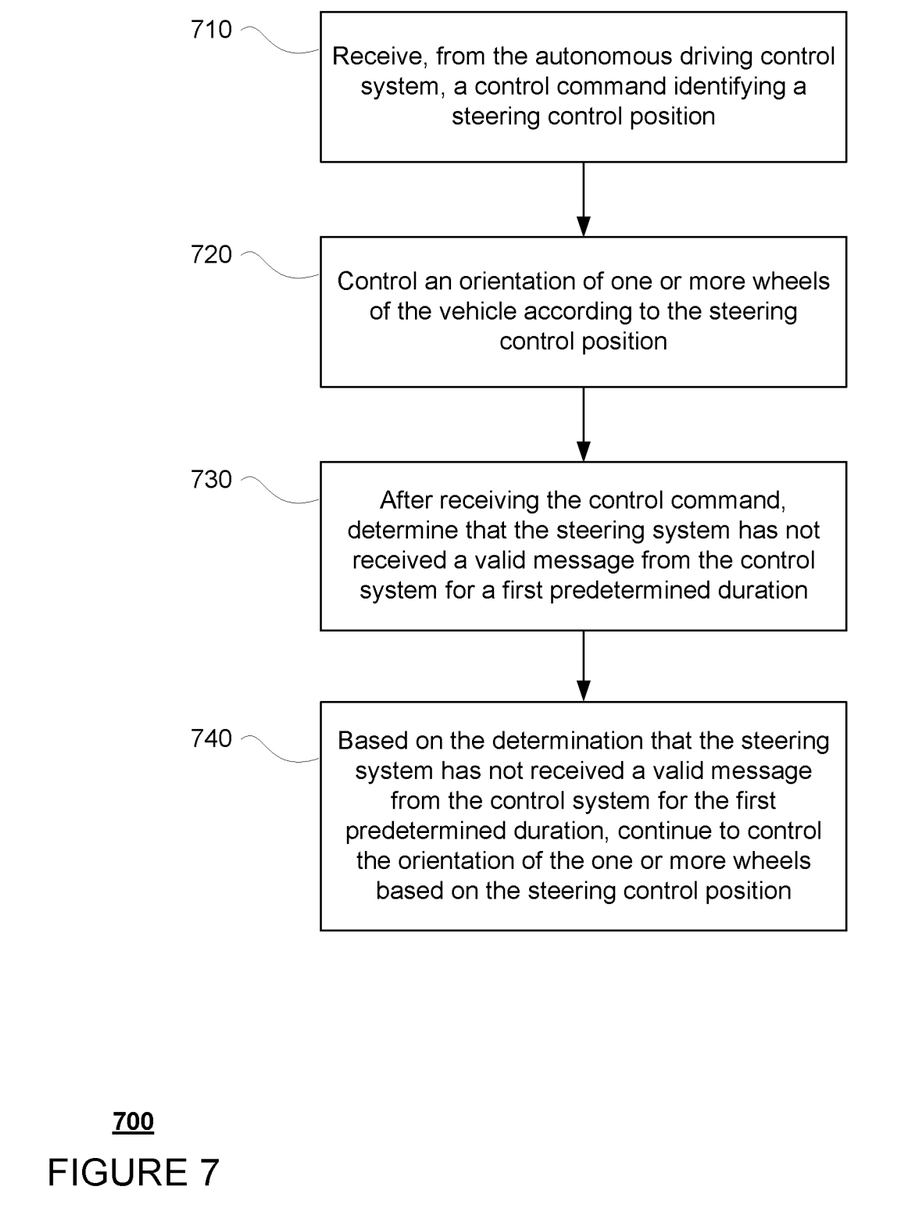
FIG. 7 is an example flow diagram in accordance with aspects of the disclosure.

FIG. 7 provides an example flow diagram 700 for controlling a vehicle in an autonomous driving mode. The diagram may represent steps taken by various features of the vehicle, such as the steering actuator 220, the one or more computing devices 110, or another computing device of the vehicle, etc. For instance, at block 710, a control command identifying a steering control position is received by one or more processors of a steering system from an autonomous driving control system. For example, as noted above, while operating in an autonomous driving mode, such as the first autonomous driving mode or the second autonomous driving mode, the computing devices 110 may send commands to the steering actuator 220 to cause the steering actuator 220 to send corresponding steering control commands to the orientation control hardware 230 to control the orientation of the wheels in accordance with a trajectory generated by the planning system 168. FIG. 6 represents vehicle 100 following a trajectory 610. In this example, the computing devices have sent a command signal to the steering actuator 220 to cause the actuator to orient one or more wheels of the vehicle at a steering control position, here an angle $\ominus$ of 5 degrees from the forward direction with respect to the vehicle in order to follow the trajectory 610.

Returning to FIG. 7, at block 720, an orientation of one or more wheels of the vehicle according to the steering control position. For example, the steering actuator 220 may cause the vehicle's wheels to rotate in accordance with the steering control position, or to an angle of 5 degrees from the forward direction with respect to the vehicle. This may cause the vehicle to automatically follow the trajectory 610. As new trajectories are generated, new steering control positions are determined and corresponding command signals are sent to the steering actuator 220 by the computing devices 110 in order to follow those new trajectories.

For instance, returning to FIG. 7 at block 730, after receiving the control command, that the steering system has not received a valid control command from the control system for a first predetermined duration is determined. In some instances, the steering system 160 may lose communication with the computing devices 110 or the computing devices 110 may send invalid messages. Examples of invalid messages may include control commands with an invalid alive counter, an invalid checksum, an invalid signal, etc. Whether there has been a temporary or complete loss of communication may be determined, for instance, by using a timer to determine whether a predetermined duration has passed since a last valid control command from the computing devices 110 has been received. In this regard, invalid messages do not restart the predetermined duration, but valid control commands do restart the predetermined duration.

The first predetermined duration may be a first predetermined period of time such as 0.05 seconds or more or less and/or a fixed number of message cycles such as 5 message cycles or more or less. These values may be selected based on a base transmit rate of the autonomous driving control system with a multiplier or offset. In this regard, the first predetermined duration may depend upon the system architecture.

At block 740, based on the determination that the steering system has not received a valid control command from the control system for the first predetermined duration, the orientation of the one or more wheels is continued to be controlled based on the steering control position. In this regard, if the steering system loses communication with the autonomous driving control system or does not receive valid control commands for more than a first predetermined duration, the steering system may respond by continuing to maintain the last valid steering control position from the last valid control command.

If the autonomous driving control system has stopped communicating with the steering system 160, it may be due to a complete failure of or temporary communication fault of the autonomous driving control system. In such cases, the steering system 160 will maintain the change in orientation of the vehicle in a more predictable way. For example, returning to the example of FIG. 6, if the last valid control command identifies a steering control position of an angle of 5 degrees from the forward direction with respect to the vehicle, the steering actuator 220 would continue to control the orientation of the vehicle's wheels using this steering control position. In this way, the vehicle may be most likely to continue to follow the trajectory 610. In addition, the deceleration system 162 may be bringing the vehicle 100 to a stop due to a similar loss of communication. For instance, the actions taken by the steering and braking systems may be based on the same predetermined thresholds (e.g. the aforementioned 5 and 10 message cycles), however depending on the system architecture that may not always be the case. In other words, there could be some specific architectures or hardware configurations where slightly different thresholds are needed for the two due to timing or other reasons.

In some instances, such as a temporary communication fault, the autonomous driving control system may resume sending control commands. In such instances, depending upon how long the lack of communication continued, the steering system may act upon or ignore the control commands. For example, if the steering system 160 completely loses communication with the autonomous driving control system for less than a second predetermined duration, the steering system 160 may continue to act upon the control commands. If the steering system 160 completely loses communication with the autonomous driving control system or receives no valid control commands for more than the second predetermined duration, the steering system may ignore the control commands. The second predetermined duration may be a first predetermined period of time such as 0.10 seconds or more or less and/or a fixed number of message cycles such as 10 message cycles or more or less. These values may be selected based on a base transmit rate of the autonomous driving control system with a multiplier or offset. In this regard, the second predetermined duration may depend upon the system architecture.

If the autonomous driving control system has temporarily stopped communicating with the steering system, there may be value in allowing the autonomous driving control system to regain control authority if communication resumes. However, if the autonomous driving control system stops communicating for an extended period of time and then resumes communicating, the autonomous driving control system may be in an invalidated state and therefore such control commands may need to be ignored.

The features described herein may provide for a useful and practical approach to addressing steering system faults for autonomous vehicles in a way which may improve overall safety of these vehicles. For instance, the steering system is able to take an initial response in the event of certain conditions. If those conditions no longer persist the steering system may resume normal operation, and if those conditions persist for too long, the steering system may ignore any future control commands.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling an autonomous vehicle without a driver, the method comprising:
receiving, by a steering system of the autonomous vehicle, a control command generated by an autonomous driving control system configured to control the autonomous vehicle autonomously without a driver, the control command identifying a steering control position, the steering system including one or more processors;
controlling, by the one or more processors of the steering system, an orientation of one or more wheels of the autonomous vehicle according to the steering control position;

after receiving the control command, determining, by the one or more processors of the steering system, that the steering system has not received a valid control command generated by the autonomous driving control system for more than a first predetermined duration since the control command was received, the control command including a last valid steering control position; and based on the determination that the steering system has not received a valid control command from the autonomous driving control system for more than the first predetermined duration, continuing, by the one or more processors of the steering system, to control the orientation of the one or more wheels by maintaining the steering control position of the control command until a valid control command generated by the autonomous driving control system is received after the first predetermined duration and within a second predetermined duration.

2. The method of claim 1, wherein the control command is a last control command received before the first predetermined duration.

3. The method of claim 2, wherein the first predetermined duration is a fixed number of message cycles.

4. The method of claim 1, further comprising:

after receiving the control command, determining that the steering system has not received the valid control command generated by the autonomous driving control system for more than the second predetermined duration; and based on the determination that the steering system has not received the valid control command generated by the autonomous driving control system for more than the second predetermined duration, continuing to control the orientation of the autonomous vehicle based on the steering control position and ignoring control commands received generated by the autonomous driving control system.

5. The method of claim 4, wherein the control command is a last control command received before the second predetermined duration.

6. The method of claim 1, further comprising:

while continuing to control the orientation of the one or more wheels, receiving a second control command identifying a second steering control position generated by the autonomous driving control system; and controlling the orientation of the one or more wheels based on the second steering control position.

7. The method of claim 6, further comprising, prior to controlling the orientation of the one or more wheels based on the second steering control position, determining that the steering system has received the valid control command generated by the autonomous driving control system with the second predetermined duration.

8. A system for controlling an autonomous vehicle without a driver, the system comprising an autonomous driving control system including one or more processors configured to operate the autonomous vehicle autonomously without a driver; and a steering system including one or more processors configured to:

receive a control command identifying a steering control position, the control command being generated by the autonomous driving control system, control an orientation of one or more wheels of the autonomous vehicle according to the steering control position, after receiving the control command, determine that the steering system has not received a valid control command generated by the autonomous driving control system for more than a first predetermined duration since the control command was received, the control command including a last valid steering control position, and based on the determination that the steering system has not received a valid control command generated by the autonomous driving control system for more than the first predetermined duration, continue to control the orientation of the one or more wheels by maintaining the steering control position of the control command until a valid control command generated by the autonomous driving control system is received after the first predetermined duration and within a second predetermined duration.

9. The system of claim 8, wherein the control command is a last control command received before the first predetermined duration.

10. The system of claim 8, wherein the first predetermined duration is a fixed number of message cycles.

11. The system of claim 8, wherein the one or more processors of the steering system are further configured to:

after receiving the control command, determine that the steering system has not received the valid control command generated by the autonomous driving control system for more than the second predetermined duration; and based on the determination that the steering system has not received the valid control command generated by the autonomous driving control system for more than the second predetermined duration, continue to control the orientation of the autonomous vehicle based on the steering control position and ignoring control commands received generated by the autonomous driving control system.

12. The system of claim 11, wherein the control command is a last control command received before the second predetermined duration.

13. The system of claim 8, wherein the one or more processors of the steering system are further configured to:

while continuing to control the orientation of the one or more wheels, receive a second control command identifying a second steering control position generated by the autonomous driving control system; and control the orientation of the one or more wheels based on the second steering control position.

14. The system of claim 13, wherein the one or more processors of the steering system are further configured to, prior to controlling the orientation of the one or more wheels based on the second steering control position, determine that the steering system has received the valid control command generated by the autonomous driving control system with the second predetermined duration.

15. A non-transitory, machine readable medium on which instructions are stored, the instructions, when executed by one or more processors, cause the one or more processors to perform a method for controlling an autonomous vehicle without a driver, the method comprising:

receiving a control command identifying a steering control position, the control command being generated by an autonomous driving control system including one or more processors and configured to control the autonomous vehicle autonomously without a driver;

controlling an orientation of one or more wheels of the autonomous vehicle according to the steering control position;

after receiving the control command, determining that a steering system of the autonomous vehicle has not received a valid control command generated by the autonomous driving control system for more than a first predetermined duration since the control command was received, the control command including a last valid steering control position; and based on the determination that the steering system has not received a valid control command generated by the autonomous driving control system for more than the first predetermined duration, continuing to control the orientation of the one or more wheels by maintaining the steering control position of the last valid control command until a valid control command generated by the autonomous driving control system is received after the first predetermined duration and within a second predetermined duration.

16. The medium of claim 15, wherein the control command is a last control command received before the first predetermined duration.

17. The medium of claim 15, wherein the method further comprises:

after receiving the control command, determining that the steering system has not received the valid control command generated by the autonomous driving control system for more than the second predetermined duration; and based on the determination that the steering system has not received the valid control command generated by the autonomous driving control system for more than the second predetermined duration, continuing to control the orientation of the autonomous vehicle based on the steering control position and ignoring control commands generated by the autonomous driving control system.

18. The medium of claim 17, wherein the control command is a last control command received before the second predetermined duration.

19. The medium of claim 15, wherein the method further comprises:

while continuing to control the orientation of the one or more wheels, receiving a second control command identifying a second steering control position generated by the autonomous driving control system; and controlling the orientation of the one or more wheels based on the second steering control position.

20. The medium of claim 19, wherein the method further comprises, prior to controlling the orientation of the one or more wheels based on the second steering control position, determining that the steering system has received the valid control command generated by the autonomous driving control system with the second predetermined duration.

* * * * *